(No Model.)
W. B. MORRIS.
STUMP PULLER.
No. 449,858. Patented Apr. 7, 1891.
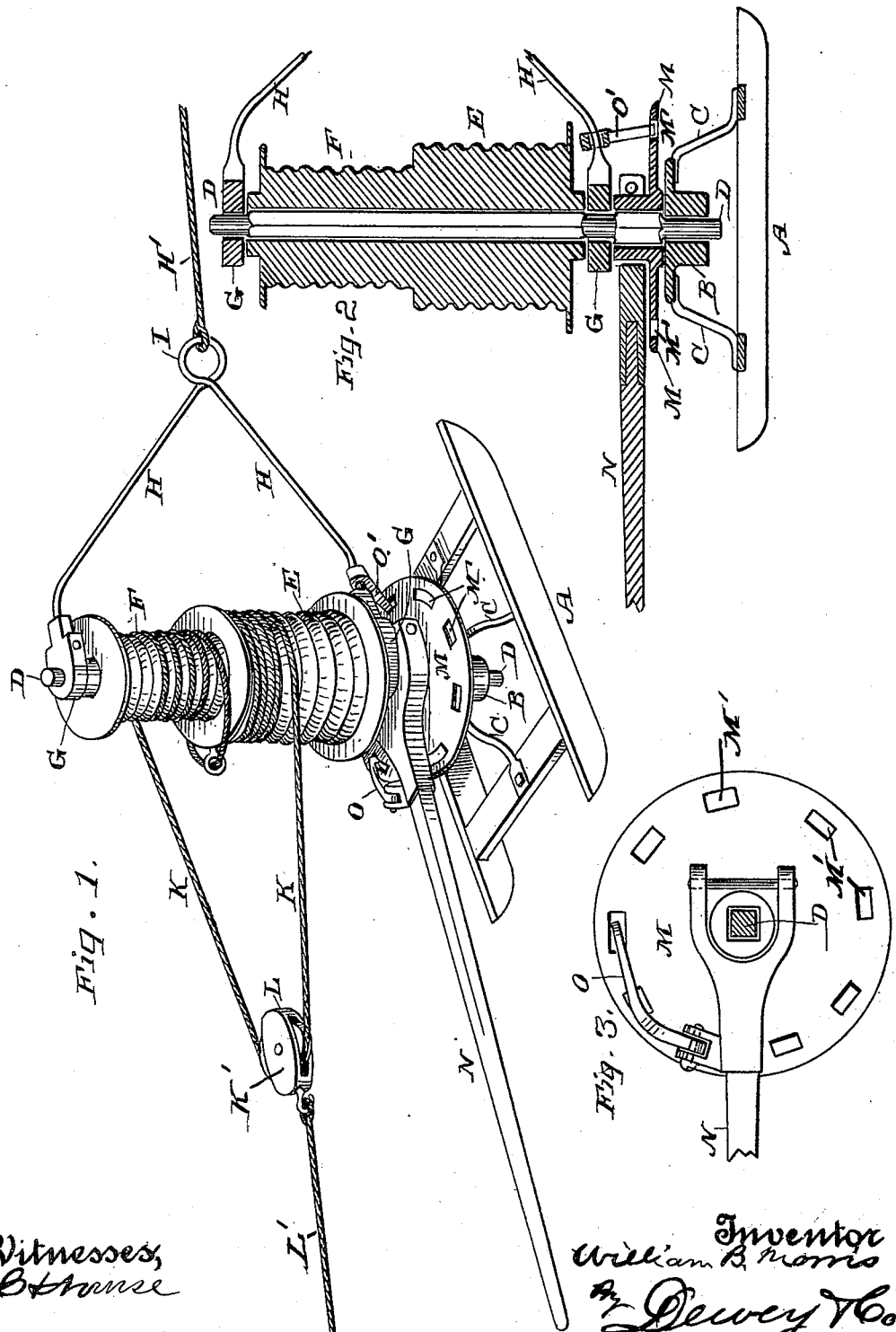

UNITED STATES PATENT OFFICE.

WILLIAM B. MORRIS, OF SEATTLE, WASHINGTON.

STUMP-PULLER.

SPECIFICATION forming part of Letters Patent No. 449,858, dated April 7, 1891.

Application filed February 6, 1891. Serial No. 380,521. (No model.)

*To all whom it may concern:*

Be it known that I, WILLIAM B. MORRIS, a citizen of the United States, residing at Seattle, King county, State of Washington, have invented an Improvement in Stump-Pullers; and I hereby declare the following to be a full, clear, and exact description of the same.

My invention relates to a novel mechanism for the application of power to extract stumps. It consists in certain details of construction, which will be more fully explained by reference to the accompanying drawings, in which—

Figure 1 is a view of my machine, showing the manner of applying power. Fig. 2 is a vertical section. Fig. 3 is a horizontal section showing the disk M and a portion of lever and pawl O.

A is the carriage bed or frame for supporting the apparatus, and which may be made in any suitable or convenient form. In the present case I have shown it in the form of a sled, which may be easily hauled over the ground to any point where it is desired to work.

B is a cylindrical socket or sleeve mounted to stand vertically upon the frame-work A and supported by the braces C, which hold it firmly in place. Through the central opening in this socket and supported thereby extends the vertical shaft D, carrying upon it the rope-winding drums E and F, having slightly different diameters, as shown. Around the top of this shaft, above the drums, and also around it at a point just below, are fitted the adjustable boxes G, within which the shaft is allowed to turn, and from these boxes the arms H extend, meeting in a strong loop or connection I. From this loop a stout rope or chain H' extends to a tree or stump, which is suitably located with reference to the one which has to be extracted and is strong enough to resist whatever strain may be brought upon it. By this arrangement and connection with the loop, which is approximately opposite the center of the winding-drum, the latter is properly supported in its upright position and will remain so under any strain put upon it.

K is a rope, one portion of which is wound around the larger part of the winding-drum in one direction and the other portion is wound around the smaller part from the opposite direction, so that when the drum is turned around the rope unwinding from the small part of the drum will be wound up somewhat faster upon the larger part, and the difference in the size of the two drums determines the amount of power which is applied at this point.

The bight of the rope K passes through a pulley-block K' and around the sheave L, and from a hook at the end of the pulley-block a rope or chain L' extends outward and is fastened around the stump which is to be extracted.

Around the lower part of the vertical shaft D is fixed a disk M to turn with the shaft and having holes M' made around its periphery at suitable intervals. Just above this disk the inner end of the lever N is loosely fitted, so that it may turn around the vertical shaft. Upon this lever is mounted a pawl O, the point of which engages the openings of the disk, so that when the lever is moved in one direction it will rotate the disk and with it the vertical shaft and the rope-winding drums or windlass which is secured to the shaft.

Upon the lower one of the boxes G (see Fig. 2) is fixed another pawl O', which engages the openings in the opposite direction, so that when the lever is moved backward for a new hold this pawl will prevent the drums from rotating in the same direction and will hold them until the lever-pawl has again engaged the teeth of the disk for another movement.

When the anchor-rope is attached sufficiently high or low, it will be possible for the horse or other animal attached to the lever to walk around constantly in one direction, passing under or over the anchor-rope, in which case the pawl attached to the lever will remain in constant engagement with one of the holes in the disk, and the drums will be constantly rotated, so as to gradually wind up the rope and pull the stump; but if the position is inconvenient the operation of the lever may be a reciprocating one, being moved backward and forward, so that its pawl will engage the ratchet and advance the latter a certain distance, and then the pawl upon the box, before described, will hold whatever has been gained until the lever-pawl makes a new engagement.

The device is powerful, light, and effective.

Having thus described my invention, what

I claim as new, and desire to secure by Letters Patent, is—

In a stump-puller, a supporting-frame, a vertical cylindrical sleeve mounted thereon, drums of different diameters having a vertical shaft, the lower end of which turns in the sleeve, boxes surrounding the shaft above and below the drums and connected by rods with a loop from which the anchor rope or chain extends, a horizontal plate, a lever loosely fulcrumed upon the vertical shaft above said plate, having a pawl which engages holes in the plate, a second pawl whereby the plate and drums are prevented from rotating backward, and a rope passing around the two-part drum, a pulley-block through which said rope passes, and connections between the pulley-block and the stump to be extracted, substantially as herein described.

In witness whereof I have hereunto set my hand.

WILLIAM B. MORRIS.

Witnesses:
S. H. NOURSE,
J. A. BAYLESS.